US 6,639,510 B1

(12) United States Patent
Soulie

(10) Patent No.: US 6,639,510 B1
(45) Date of Patent: Oct. 28, 2003

(54) TACTILE READING SYSTEM FOR DATA COMING FROM A COMPUTER AND ASSOCIATED COMMUNICATION DEVICE

(76) Inventor: Philippe Soulie, F-12490, Viala du Tarn (FR)

( * ) Notice: Subject to any disclaimer, the term of this patent is extended or adjusted under 35 U.S.C. 154(b) by 0 days.

(21) Appl. No.: 09/914,707
(22) PCT Filed: Mar. 1, 2000
(86) PCT No.: PCT/FR00/00501
§ 371 (c)(1),
(2), (4) Date: Oct. 9, 2001
(87) PCT Pub. No.: WO00/52665
PCT Pub. Date: Sep. 8, 2000

(30) Foreign Application Priority Data

Mar. 2, 1999 (FR) .............................. 99 02668

(51) Int. Cl.[7] .................................. H04B 3/36
(52) U.S. Cl. .............................. 340/407.2; 340/407.1; 434/113
(58) Field of Search .................... 340/407.2, 407.1, 340/825.19; 434/112, 113, 115

(56) References Cited

U.S. PATENT DOCUMENTS

| 3,659,354 A | * | 5/1972 | Sutherland | ............. 434/113 |
|---|---|---|---|---|
| 4,037,200 A | * | 7/1977 | Cranmer | ............. 340/825.19 |
| 4,044,350 A | * | 8/1977 | Tretiakoff et al. | ....... 340/407.2 |
| 4,194,190 A | * | 3/1980 | Bareau | ............. 340/407.2 |
| 4,752,772 A | * | 6/1988 | Litt et al. | ............. 345/160 |
| 4,905,001 A | | 2/1990 | Penner | |
| 5,515,305 A | | 5/1996 | Register | |
| 6,255,938 B1 | * | 7/2001 | Bornschein | ............. 340/407.2 |
| 6,459,364 B2 | * | 10/2002 | Gupta | ............. 340/407.1 |

FOREIGN PATENT DOCUMENTS

| DE | 94 00 699 | 3/1994 |
|---|---|---|
| DE | 42 41 937 | 6/1994 |
| GB | 2 311 888 | 10/1997 |
| WO | 97 15909 | 5/1997 |
| WO | 98 32112 | 7/1998 |

* cited by examiner

Primary Examiner—John Tweel
(74) Attorney, Agent, or Firm—Young & Thompson

(57) ABSTRACT

A tactile reading system and a communication device for tactile data reading and input with a computer. It includes a set of sensitive means (13, 13') located each in the proximity of or inside the input means (12, 12') and arranged such that they can, under the control of the computer, communicate a binary sensation on each one of the user's finger. To each combination of simultaneous detection of sensations on the fingers, corresponds a read character, the character being the same as the one transmitted by the computer under the simultaneous action on the input keys associated with the active reading keys for the combination concerned. The invention is particularly designed for blind people.

11 Claims, 6 Drawing Sheets

TACTILE READING SYSTEM FOR DATA COMING FROM A COMPUTER AND ASSOCIATED COMMUNICATION DEVICE

BACKGROUND OF THE INVENTION

1. Field of the Invention

This application is a national phase of application Ser. No. PCT/FR00/00501 filed Mar. 1, 2000, now abandoned.

This invention concerns equipment permitting a user to perform touch-sensitive reading of information from an electronic calculator, generally intended for the blind.

2. Description of Related Art

At the present time, Braille displays do exist that, according to the model, comprise twenty to eighty characters, each of these characters consisting of six to eight pins activated by the same number of piezoelectric cells controlled by the calculator and making it possible to create a relief on said character. Because of their technology, these reading devices are bulky and expensive. In addition, these devices are designed for reading only and the user must use another piece of equipment, of the Braille keyboard or other type to perform the entry of information into the electronic calculator. It is to be noted that such displays must be set on a plane support during their use and do not fit easily into portable pocket devices, such as electronic memo pads, messengers or others.

From patent documents WO 9832112 (NISSEN DOUGHTY) and U.S. Pat. No. 4,905,001 (PENNER), systems are known of for touch communication between a blind user and an electronic calculator, enabling said user to read or enter data into the electronic calculator. These systems contain sensitive units to give the user a sensation, as controlled by the calculator, and computer data entry units.

More specifically for the system described by WO 9832112, the sensitive units operate with a pair of touch-sensitive components assigned to each finger of the user. These components for each finger vibrate at different frequencies to communicate specific information. A combination between these vibratory states makes available to the user a significant combination of touch information.

Again more specifically, the system described by U.S. Pat. No. 4,905,001 features a handle provided with touch-sensitive components that are divided into a group of four components arranged on both parts of the handle.

BRIEF SUMMARY OF THE INVENTION

The purpose of this system is again to propose touch-sensitive units offering a significant amount of information to be transmitted.

It appears that these devices, like the previous ones, are not suitable for transposition to portable pocket equipment, such as a memo pad or alike, because of their operation and structure.

This invention makes it possible to resolve these disadvantages by proposing a system based on a simple and inexpensive technology and thus permits the user to enter data into an electronic calculator as well as to read data from this same calculator.

The system under this invention is of the type described by WO 9832112 and U.S. Pat. No. 4,905,001 to enable a blind user to read or enter data into an electronic calculator. This system contains sensitive units and entry units as above-mentioned.

The system under the invention distinguishes itself in that it can fit in the calculator case. The sensitive units are designed to give to the user, as controlled by the calculator, at least a binary sensation on each of at least two fingers of said user while each combination of simultaneous binary sensations can be assigned to character-type or other information transmitted by the calculator.

Therefore, an information unit can be transmitted through the simultaneous detection of the presence or not of a sensation on each of the different fingers.

In addition, the sensitive units are distributed over each one of at least six fingers of the user, each sensitive unit corresponding to one of the dots on a Braille character.

Finally, each sensitive unit is arranged in relation to an entry unit so that the user can perform the entry or reading without changing the overall position of his/her hands, i.e., it is placed close to or inserted within the body of the entry unit.

The entry unit can be used, for example and depending on the software selected, as a Braille keyboard by pressing simultaneously the main keys corresponding to the dots of the Braille character to be transmitted.

In the reading mode, the calculator transmits a character by activating the sensitive units associated with the same keys that, when pressed in the entry mode, communicate the same character to the calculator.

With the sensitive units communicating to the user's fingers a combination of simultaneous sensations, said user can establish the correspondence between said combination and said character to be read, then confirm the actual elementary reading by pressing a key to request transmission of the following character from the calculator. Under another embodiment, transmission of the characters can be achieved in a sequential manner according to a frequency defined by the user. To switch from the reading mode to the entry mode, the user can press an auxiliary key.

Under several alternate designs of the invention, the sensitive units can communicate to the user a binary sensation in the form of a relief, of the locking of a mobile component, of a vibratory sensation, of a thermal sensation, of a light electrical pulse or any other type of sensation.

Under one embodiment of the invention, each sensitive unit can be equipped with a well-known device, such as an electromagnet, a piezoelectric cell, or a part made out of a so-called "form-memory" material, moving a component capable of creating a relief. Such relief may appear on the face of the equipment case accessible to the user's fingers, or on the button of the key itself when the key, under an alternative design, contains the sensitive unit.

Under another design and when the entry unit contains the sensitive units, the sensation involved in the transmission of a character to be read consists of locking said key pressed down. To perform the reading, the user presses simultaneously all said keys and establishes the combination corresponding to the code transmitted by detecting all unlocked keys. Once the user has identified the character, he/she releases all pressed keys, thus informing the calculator that it may transmit the following character.

Under a preferred embodiment, the mechanism capable of locking the key mechanism in the down position consists of an electromagnet that, when energized, draws to itself a component that opposes any movement of the entry key.

The communication device under the invention can be designed as a conventional Braille keyboard that integrates the sensitive units arranged in accordance with the invention. In that case, said device should be placed on a support to be used.

Under an alternate design, the device under the invention can be contained on a case characterized by the fact that the majority of the entry units and of the sensitive units is located on the face of said case that is opposite to the face designed to be facing the user. Thus, this reading and entry equipment can be used without requiring any support since it is held between the palms of the hands of the user pressing or reading with his/her thumbs the keys and the sensitive units possibly located on the front face or on the edges of said case while the other fingers of each hand can press or read the keys and sensitive units located on the opposite face.

The device under the invention can be managed by a software based on the Braille method and therefore contain only six to eight sensitive units. Both hands are then required to read a single Braille character. Under an alternate design, other sensitive units are judiciously placed in sufficient quantity so that each hand can enter or read a common Braille character.

Under an alternate design, the equipment under the invention does not contain any display elements other than ten sensitive units arranged in two groups of five assigned to the five fingers of the left hand and the five fingers of the right hand, respectively. Such device, managed by software based on a different Braille method and using the thirty-one possible combinations on five elements, makes it any way possible to read or to enter most common characters with only one hand.

Under another embodiment, several sensitive units can be distributed over each finger or act also on the user's palm.

Regardless of the embodiment, the touch-sensitive reading system or the communication device under the invention can be connected to a standard personal computer port or integrated into its case, while the calculator and possibly a communication module make it possible to connect to a network such as the Internet and to an electronic message service.

BRIEF DESCRIPTION OF THE SEVERAL VIEWS OF THE DRAWINGS

The advantages and characteristics of this invention will become more apparent in the description below that relates to the attached drawings that represent several non-limiting embodiments of the invention.

DETAILED DESCRIPTION OF THE INVENTION

Figure 1:
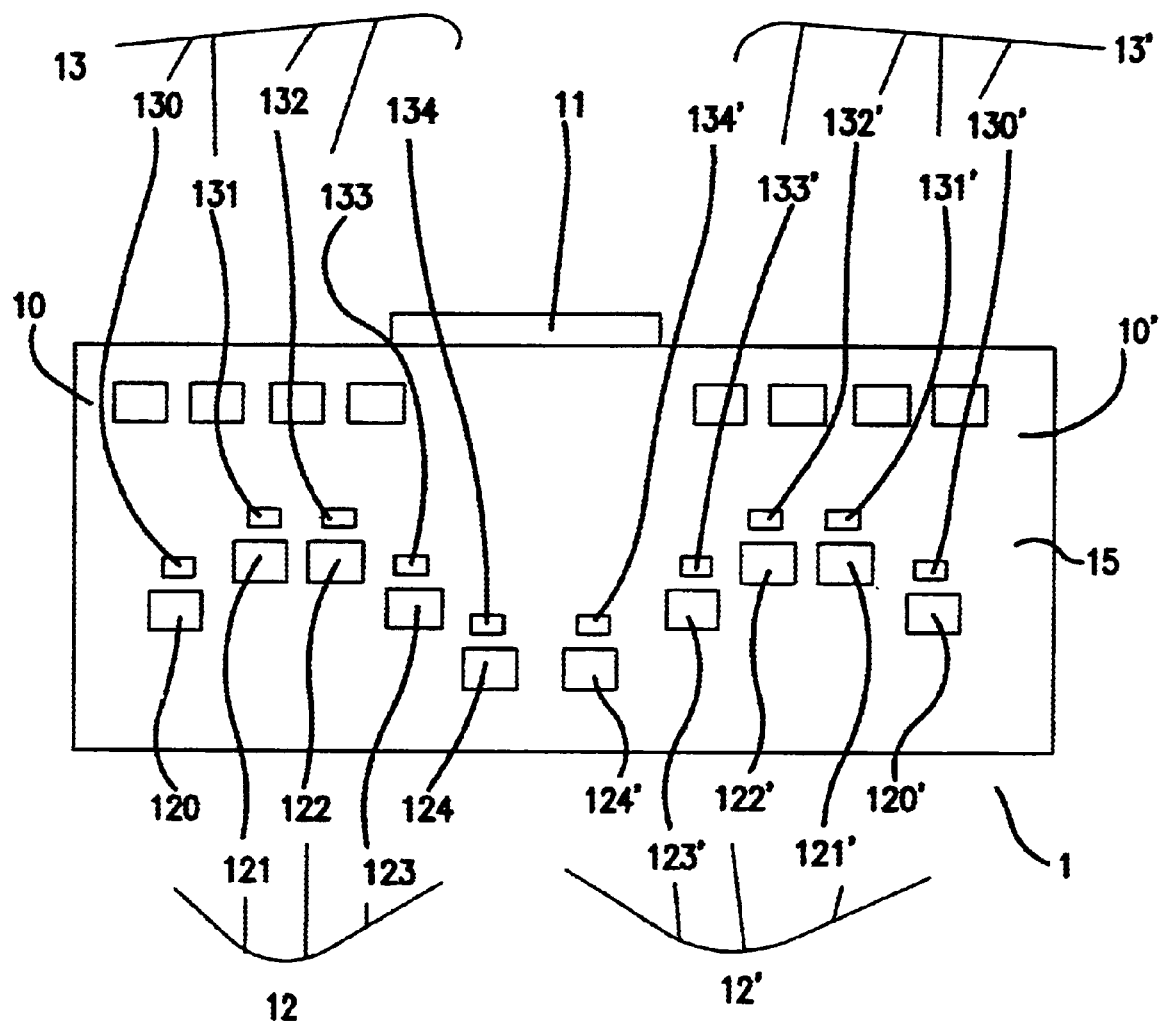
FIG. 1 shows a schematic view of one embodiment of a communication device under the invention.

On FIG. 1, a case 1 can be seen that represents the communication device under the invention in an alternate design under which the sensitive units are placed close to the entry units. This case contains two series 10, 10' of secondary entry units used to perform such functions as switching from the entry mode to the reading mode, moving a cursor, or others. This case 1 also contains a connector 11 to connect the keyboard to a calculator—not shown—and two series 12 and 12' of entry units consisting of five main entry keys, with the first series designed to be pressed with the left hand and series 12' designed to be pressed with the right hand. The arrangement of keys 12 or 12' is such that keys 120 and 120' can be pressed with a little finger, 121 and 121' with a ring finger, 122 and 122' with a middle finger, 123 and 123' with a forefinger and 124 and 124'with a thumb. Each hand may thus press five keys at the same time and therefore enter two five-bit codes at a time. Above each key of series 12 and 12' is located a sensitive unit of series 13 or 13' that contains a well-known and not shown device, such as a piezoelectric cell or electromagnet and activates one of dots 130 through 134, 130' through 134', designed to create a relief on the front face 15 of case 1 and thus communicating a binary sensation to the user. Under another embodiment, it is possible to communicate to the user a binary sensation in the form of the locking of a mobile element, of a thermal or vibratory sensation, or of a light electrical pulse.

To do the entry, the user positions his/her fingers on the keys of series 12 and 12', and to do the reading, the user positions his/her fingers on the facings of dots of series 13 and 13'. Such a case 1 shall be set on a support and can be connected to a standard port of a personal computer, for example to the parallel port through a circuit shown in FIGS. 5a and 5b. Thus, a simple, compact and inexpensive system is achieved that enables a sight-challenged person to exchange information with a computer system.

Figure 2:
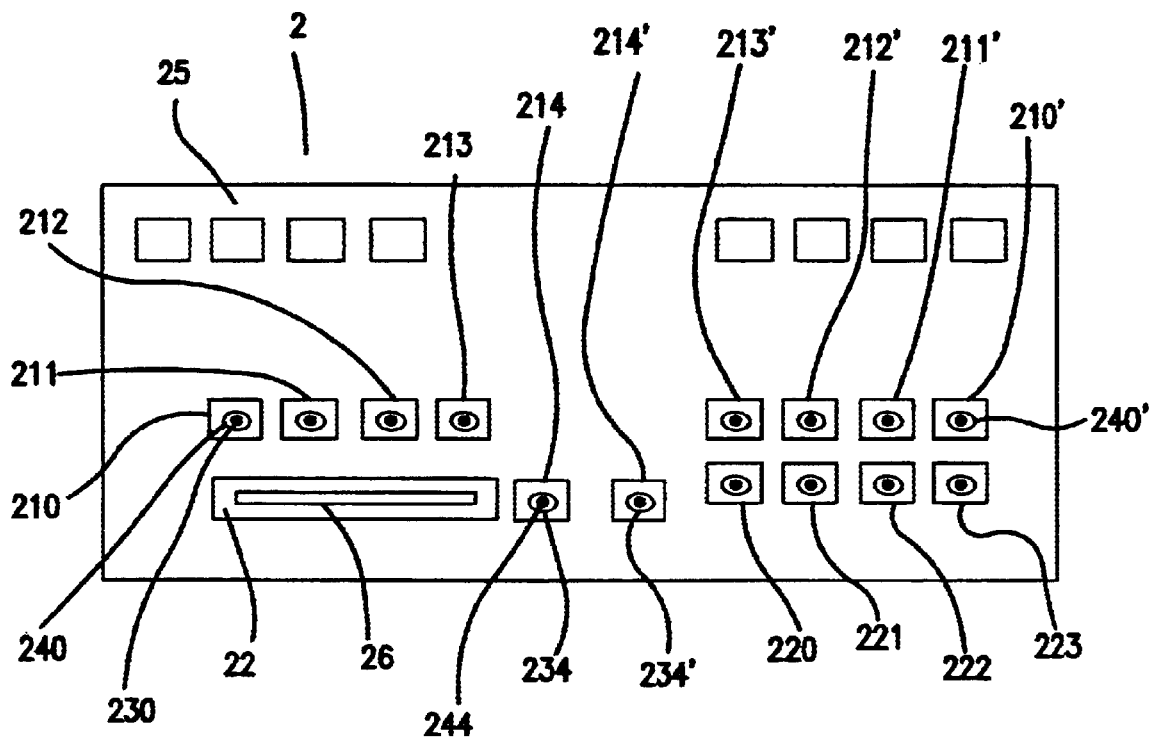
FIG. 2 shows a schematic view of another embodiment of a communication device under the invention.

When referring to FIG. 2, on the front face 25 of a case 2 a set of entry units 210 though 214 and 210' through 214' can be seen that integrates the sensitive units. According to one embodiment, each entry unit features a hole such as 230 allowing for a component such as 240 to be inserted through the key button when under one embodiment a device with piezoelectric cell or other is activated or when, under another embodiment, a non-locked key is pressed in order to create on said button a relief that can be detected by the user. Said keys and said components capable of creating a relief on the key button are arranged in a manner similar to the elements of series 12, 12', 13 or 13' in FIG. 1 so that they can fulfill the same functions. FIG. 2 also shows a key 22 accessible by the palm of the left hand using free fingers or "extended" fingers accessing also and simultaneously one or more keys 210 through 213. This key 22 that also contains a display element creating a relief under 26 can serve as sixth dot so as to enter or read with only one hand the common Braille characters when the reading and entry equipment is managed by a suitable Braille-based method. Such key 22 can also be arranged under the right hand. Under an alternate design, key 22 is replaced by four keys 220, 221, 222 and 223 fulfilling the same reading and entry functions as unit 22, 26 plus possibly, when they are pressed individually, other functions peculiar to the management software selected. Such equipment makes it possible to read or enter a great number of distinct codes without having to change the position of the fingers.

Figure 3A:
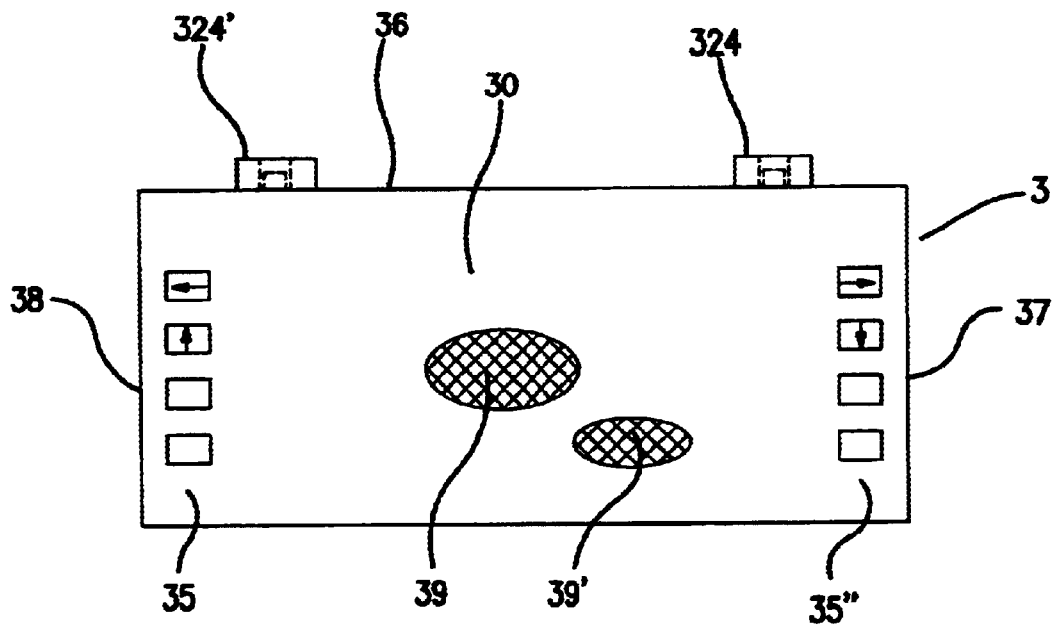
FIG. 3a shows a top view of the front face of a communication device under the invention that does not require any support to be used.
Figure 3B:
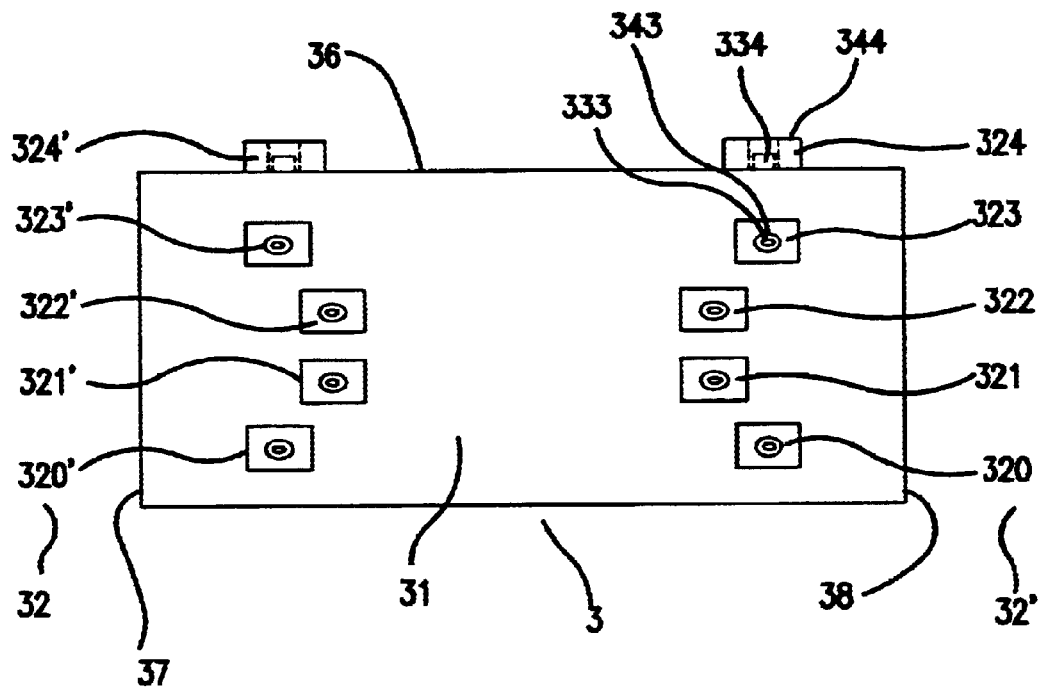
FIG. 3b shows a top view of the rear face of the same communication device.

FIGS. 3a and 3b show a case 3 containing an electronic calculator not represented, and featuring on its front face 30 a speaker 39, a microphone 39' permitting to listen to or record voice messages; as well as a number of keys 35, 35' with functions such as cursor moving or reading/entry mode change keys. The rear face 31 and the upper edge 36 of case 3 contain two main series of keys 32, 32', the first being designed to be pressed by the fingers of the left hand and 32' by the fingers of the right hand. The arrangement of keys 32 or 32' is such that keys 320 and 320' can be pressed by a little finger, 321 and 321' by a ring finger, 322 and 322' by a middle finger, 323 and 323' by a forefinger and 324 and 324' by a thumb. The button of each key has a hole such as 334 or 333 to run a pin such as 344 or 343 through. Under one embodiment of the key containing a sensitive unit in accordance with one characteristic of the invention, said pin such as 344 or 343 is capable of creating a relief on the button of said key under the control of a component such as a piezoelectric cell. Under another embodiment, said pin such as 344 or 343 is capable of creating a relief on the button of said key when the key is pressed. In this latter case and in the reading mode, this relief appears only on the keys pressed and therefore not locked. The case 3 can be held from the lateral sides 37 and 38 between the palms of the user's hands and reading or entry can then be done using both hands without requiring any support. Such device is especially well suited for blind persons who wish to access many services of a pocket microcomputer possibly connected to a messaging network or others.

Figure 4:
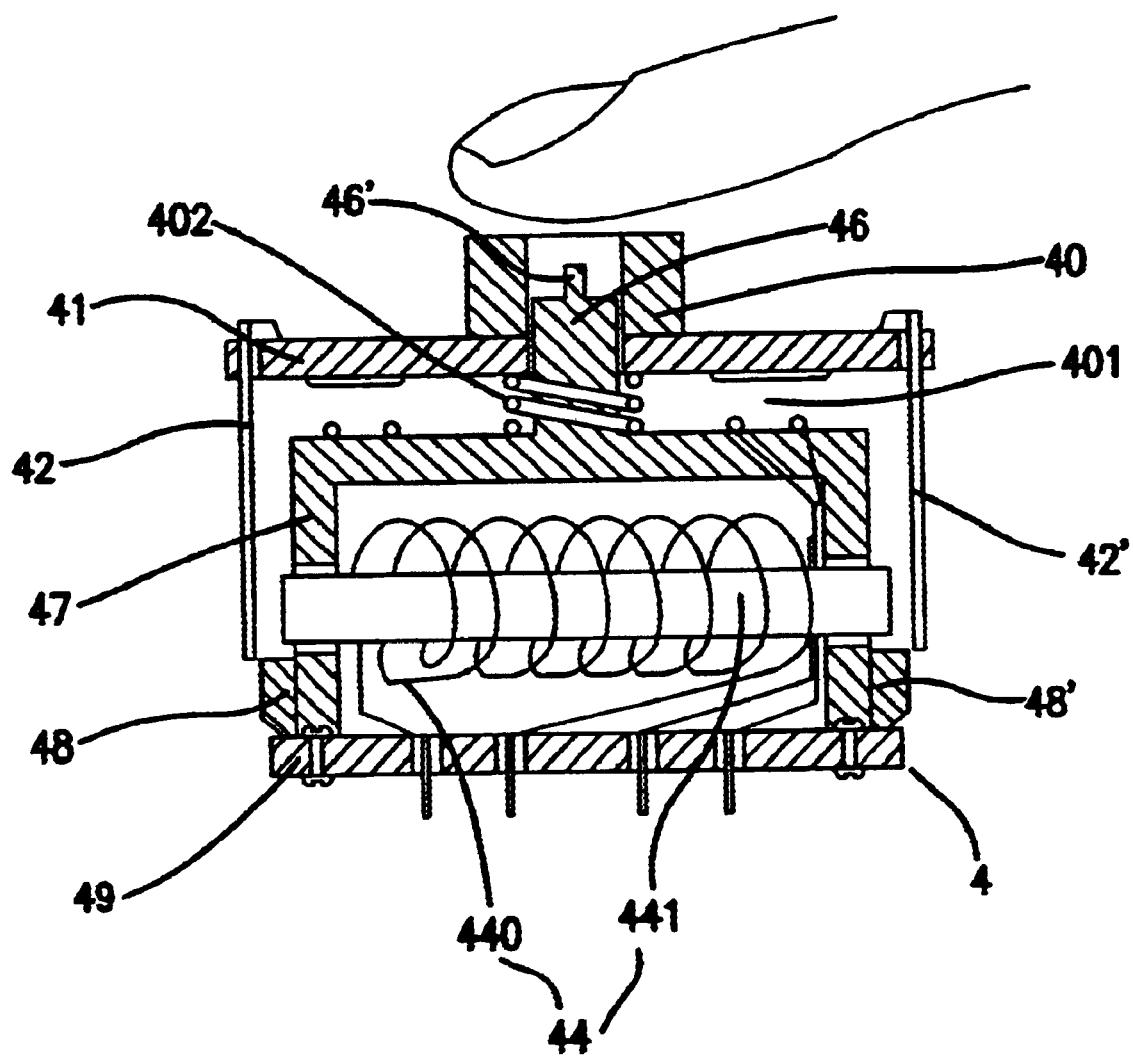
FIG. 4 shows a cross-sectional view of one embodiment of an entry unit integrating a sensitive unit, making it possible to communicate binary touch-sensitive information to a user.

FIG. 4 shows a reversible locking key 4 that permits to both read and enter data and is provided on units such as those presented in FIGS. 2 or 3. This key 4 contains a button 40 capable of sliding on an axis 46 whenever pressure is applied on its upper face and whenever coil 440 of an electromagnet 44 is not energized. In the pressed down position, an integral part of button 40 closes a contact 401 informing the calculator of the state of key 4. Once pressure is released, a spring 402 returns button 40 and contact 401 to the "rest" position. If coil 440 is then energized, core 441 draws to its contact metallic arms 42 and 42' hinged onto part 41, also metallic and closing the field lines. Both arms 42 and 42' then butt against parts 48 and 48' integral with body 47 topped by axis 46, securing the electromagnet 44 and secured on a base 49. The key is thus locked in the pressed down position. An element 46' overlying axis 46 permits to create a relief identifiable with the user's finger when the key is pressed down so as to enable said user to easily locate the non-locked keys. By combining the sensations felt on each finger, the user records the combination corresponding to the code transmitted by the calculator using the keyboard management program. Such keys can be connected to an electronic calculator through a circuit such as the one shown in FIG. 5. In the reading mode, the calculator sends a signal to the relevant keys 4 and waits for the user to press and release the non-locked keys before sending the next information.

Figure 5A:
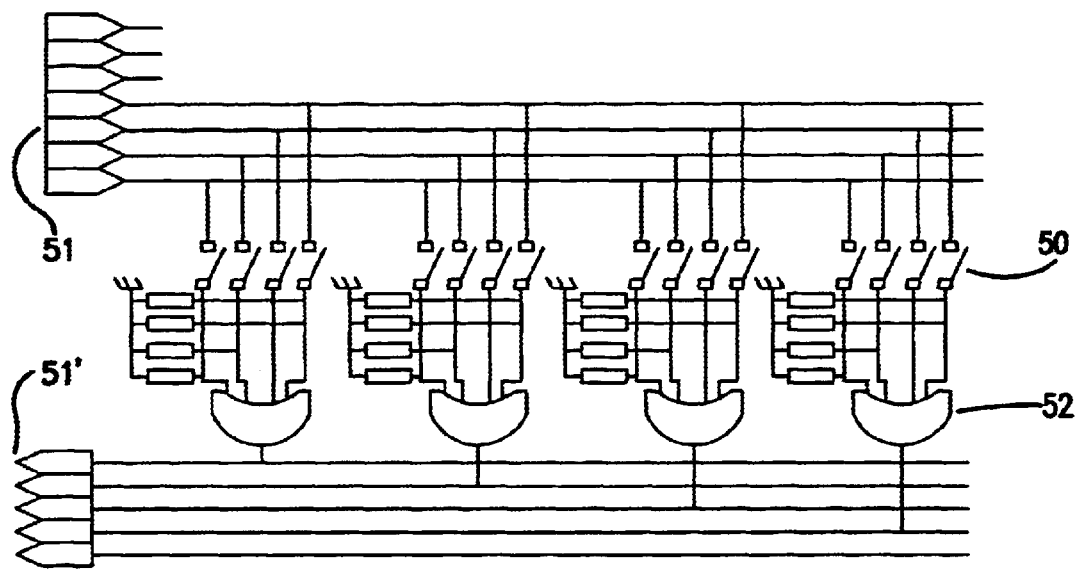
FIGS. 5a and 5b are diagrammatic illustrations showing an electronic circuit making it possible to connect a keyboard under the invention to the parallel port of a personal computer.

FIG. 5a shows a series of contacts 50 that can be the contacts 401 activated by keys of the type shown in FIG. 4 or others and that are part of keyboard 2 or 3. These contacts 50 are connected on one hand to a connector 51 that is itself connected to the parallel data port of a calculator not represented and on the other hand to the logic gate inlets 52, here of the OR type but that may be other types, with their outlets connected to a connector 51' that is itself connected to the inlet parallel port of the same calculator. Reading of the contact state is achieved by scanning connector 51 and the information is collected on connector 51'. As the data port contains eight pins, keyboards with up to forty contacts 50 can be generated.

Figure 5B:
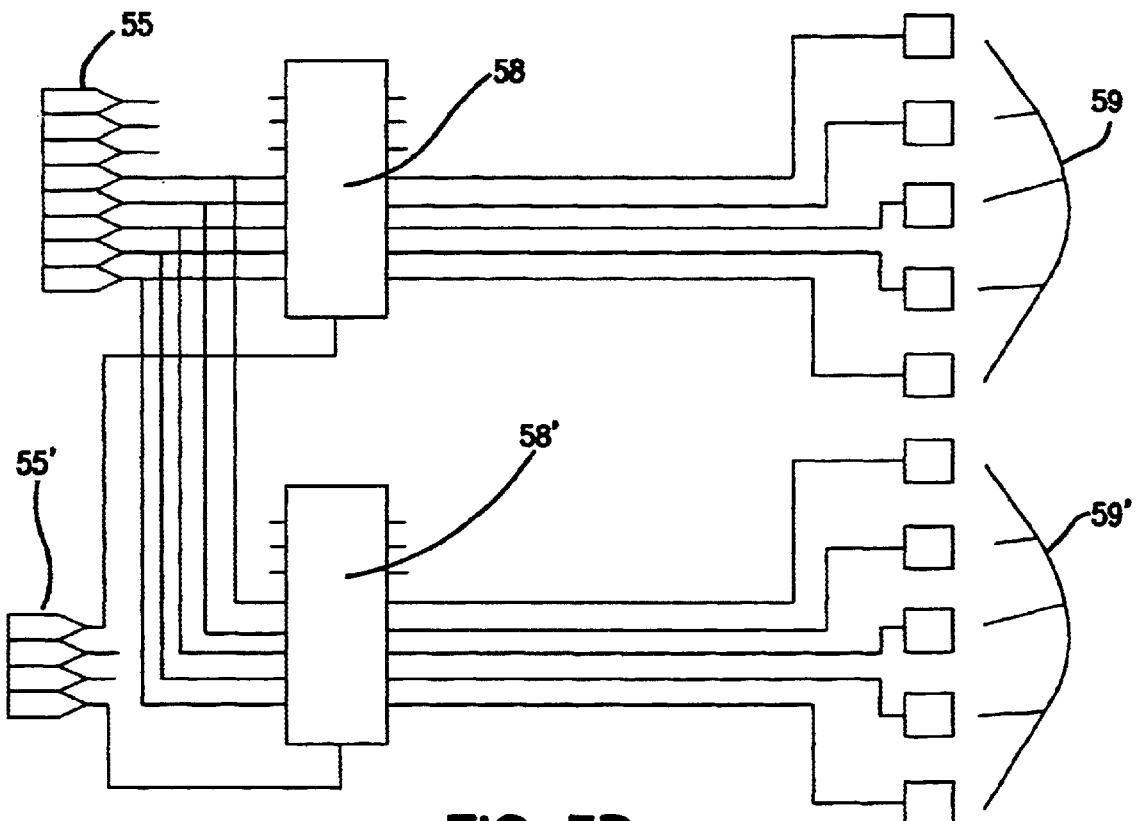

FIG. 5b shows a connector 55 connected to the data parallel port of a calculator not represented, and another connector 55' connected to the control parallel port of this same calculator. Data is conveyed onto a lock 58 or 58' selected by the state of the connector 55', and the outlets of these locks activate devices 59 and 59', such as the electromagnet 44 of key 4, piezoelectric cells or other devices permitting to communicate directly or indirectly to the user a binary touch sensation on the fingers. These very simple electronic circuits permit to achieve a reading/writing peripheral such as those presented in FIGS. 1 and 2, inexpensive and suited for the sight-impaired.

Figure 6:
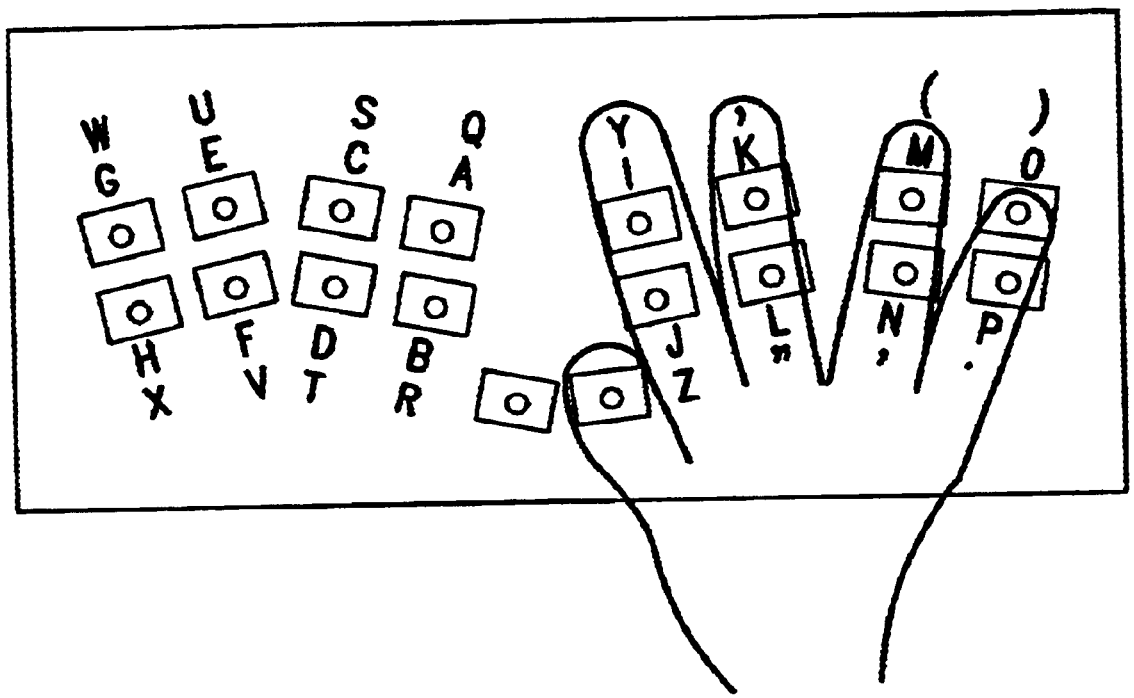
FIG. 6 is a schematic view of still another embodiment of the communication device.

FIG. 6 shows one embodiment of the invention in which several sensitive devices are associated with each finger. A sensitive device is associated with each thumb of the user. Two sensitive devices are assigned to each one of the other fingers. Each sensitive device of these eight fingers, i.e., sixteen sensitive devices can correspond to two characters. The presence or not of a sensation on the sensitive device corresponding to the thumb permits to define the character to which the sensation corresponds. This embodiment of the invention constitutes another method of combinational reading.

I claim:

1. Touch-sensitive reading system that enables the user to read or enter data on an electronic calculator, comprising sensitive devices designed to give a sensation to a user, as controlled by the calculator, and devices to enter data onto the calculator, wherein, while said system can be integrated into a case (3) itself of the electronic calculator, said system is comprised of sensitive devices (13, 13') permitting to give to the user, as controlled by the calculator, at least one binary sensation on each of at least two fingers of said user, with each combination of simultaneous binary sensations being able to be assigned to a character-type information transmitted by the calculator, said sensitive devices (13, 13') being distributed over each of at least six fingers of the user, with each sensitive device corresponding to one of the dots of a Braille character, each sensitive device being arranged in relation to an entry station enabling the user to transmit binary information to the calculator.

2. Touch-sensitive reading system according to claim 1 characterized in that the sensitive units (13, 13') provide a binary sensation to each finger through the presence or not of a relief on the surface of said sensitive units.

3. Touch-sensitive reading system according to claim 1 wherein said sensitive units (13, 13') are comprised of mobile elements, the binary sensation being provided by the locking or freeness of each mobile element.

4. Touch-sensitive reading system according to claim 1 characterized in that the sensitive units (13, 13') provide a binary sensation to each finger in a vibratory form.

5. Touch-sensitive reading system according to claim 1 characterized in that the sensitive units (13, 13') provide a binary sensation to each finger in the form of a thermal sensation.

6. Touch-sensitive reading system according to claim 1 characterized in that the sensitive units (13, 13') provide a binary sensation to each finger in the form of a light electric pulse.

7. Communication device with a calculator comprising at least a touch-sensitive reading system according to claim 1, wherein each sensitive unit (13, 13') fits in each entry unit (210, 323, 324, 40).

8. Device according to claim 7, wherein each entry unit (40) is comprised of a key press-down mechanism and wherein said sensitive units (13, 13') are comprised of a mechanism capable of locking the key press-down mechanism.

9. Communication device with a calculator comprising at least a touch-sensitive reading system according to claim 1, wherein each sensitive unit (13, 13') is arranged close to each entry unit (12, 12').

10. Device according to claim 7, wherein said sensitive units (13, 13') and the entry units (12, 12') are located on the face (31) of a case opposite to that designed to be facing the user.

11. Touch-sensitive reading system according to claim 1, characterized in that several sensitive units can be distributed over each finger or also act on the user's palm.

* * * * *